Dec. 23, 1952

F. KRAMRISCH 2,622,546

LONG SPAN STRUCTURE

Filed Dec. 4, 1948

8 Sheets-Sheet 1

INVENTOR.
FRITZ KRAMRISCH
BY
Everett G. Wright
ATTORNEY

INVENTOR.
FRITZ KRAMRISCH
BY Everett G. Wright
ATTORNEY

Dec. 23, 1952 F. KRAMRISCH 2,622,546

LONG SPAN STRUCTURE

Filed Dec. 4, 1948 8 Sheets-Sheet 3

INVENTOR.
FRITZ KRAMRISCH
BY
Everett G. Wright
ATTORNEY

LONG SPAN STRUCTURE

Filed Dec. 4, 1948

8 Sheets-Sheet 4

INVENTOR.
FRITZ KRAMRISCH
BY
Everett G. Wright
ATTORNEY

Dec. 23, 1952 F. KRAMRISCH 2,622,546

LONG SPAN STRUCTURE

Filed Dec. 4, 1948 8 Sheets-Sheet 5

INVENTOR.

FRITZ KRAMRISCH

BY Everett G. Wright

ATTORNEY

INVENTOR.
FRITZ KRAMRISCH
BY
Everett G. Wright
ATTORNEY

INVENTOR.
FRITZ KRAMRISCH
BY
Everett G. Wright
ATTORNEY

Dec. 23, 1952 F. KRAMRISCH 2,622,546

LONG SPAN STRUCTURE

Filed Dec. 4, 1948 8 Sheets-Sheet 8

INVENTOR.
FRITZ KRAMRISCH.
BY
Harness, Dickey & Pierce
ATTORNEYS.

Patented Dec. 23, 1952 2,622,546

UNITED STATES PATENT OFFICE 2,622,546

LONG SPAN STRUCTURE

Fritz Kramrisch, Detroit, Mich., assignor to Albert Kahn Associated Architects & Engineers, Inc., a corporation of Michigan Application December 4, 1948, Serial No. 63,539

7 Claims. (Cl. 108—1)

This invention relates to improvements in structures for building and other types of construction particularly advantageous and adaptable in situations where long spans located at relatively great heights need be employed.

It is well known in the prior art that the usual truss construction is not economical in long clear span structures such as aircraft assembly plants, hangars and the like. In clear spans of two hundred or more feet, trusses become very uneconomical inasmuch as they then fall into the realm of bridge construction. Such trusses are extremely large and heavy, they must be shipped knocked-down, and the members thereof must be sorted and assembled at the site, and, as a result of the heavy tonnage and erection problems involved, long span truss construction is very costly in material, field assembly, erection, and in time required for completion.

With the foregoing in view, the primary object of the invention is to provide improved cable supported long span construction requiring a very low tonnage of steel, which may be easily and economically erected, which requires a minimum of erection equipment, and which is adaptable to many types of structures.

It is important that cable supported long span construction embodying the invention not be associated or confused with known suspension bridge construction. In suspension bridge construction, rigidity and stiffness are a primary consideration. On the other hand, in cable supported long span structures embodying this invention such as assembly plant or hangar roof construction, the requirements are essentially different than those of a bridge or the like. The cable suspended structure is used to carry a light relatively flexible or floating roof, it is just strong enough to carry the roof, the snow load on the roof and suspended loads, and it is just rigid enough to prevent damage to roof decking, waterproofing, and the like. Obviously, then, a repetition of suspended bridge or long span truss construction does not provide an economical, practical, or otherwise satisfactory solution.

Structures embodying this invention are more flexible per se and the required rigidness or stiffness thereof is not obtained through the rigidity of the joints between the various members comprising the structure but through the mechanics of the members employed and through their disposition.

The first basic feature of this invention is the elimination of the usual stiffening truss and its replacement by counter-cables which span between the same supports or pylons as the main load carrying cables but at a generally opposite curvature. The counter-cable is made to participate in restoring the deformation of the load carrying cable and to provide a counterbalancing force which reduces the deflection of the load carrying cable under all symmetrical loadings. Also, the counter-cable reduces materially the load carrying cable's deflection under unsymmetrical loading.

A second basic feature of this invention is the elimination of the usual anchor cables at the pylons in the completed structure. The pull of both the carrying cables and the counter-cables is resisted by linked struts which extend across the entire span, the said struts holding the pylons firmly in place.

The third basic feature of this invention is the flexibility of the structure in all directions. In bridge construction, the connections of the verticals to the cables are generally rigid. However, in the novel construction employed in carrying out this invention, the connections between cables and verticals are accomplished by such means as sliding shoes or revolvable bearings or the like. Furthermore, all connections of struts to verticals and of strut sections to strut sections are by means of pins or the like to provide the required flexibility in the plane of the bents. Flexibility perpendicular to the bents is obtained by a simple connection of the purlins and bracing trusses to the verticals of each bent which allows limited but sufficient rotation at the joint. This all-directional flexibility as provided makes the structure self-adjusting to a position of equilibrium for each condition of loading without producing high secondary stresses due to joint fixation or rigidity.

A fourth and equally important feature of this invention is that, with the method of erection to which the structure lends itself, no unexpected or high erection stresses are developed in the partialy erected structure caused by deviation from the final assembled organization of elements. And further, the structure may be erected without the use of costly falsework.

While cable supported long span construction embodying the invention is applicable to and may be employed in many and various types of structures including bridges where relatively greater deformations are acceptable, the embodiment of the invention shown in the drawings and herein described for the purpose of illustration is a cable supported long span roof of light construction of a nature which may serve as the roof of a hangar or a clear span manufacturing building of large expanse and area.

Many other objects and features of the invention will become apparent by reference to the following detailed description taken in connection with the accompanying drawings, in which.

Figs. 24–33 inclusive show diagrammatically the method of erecting cable supported long span structures embodying the invention.

Figures 4, 5, 7, 8, 9:
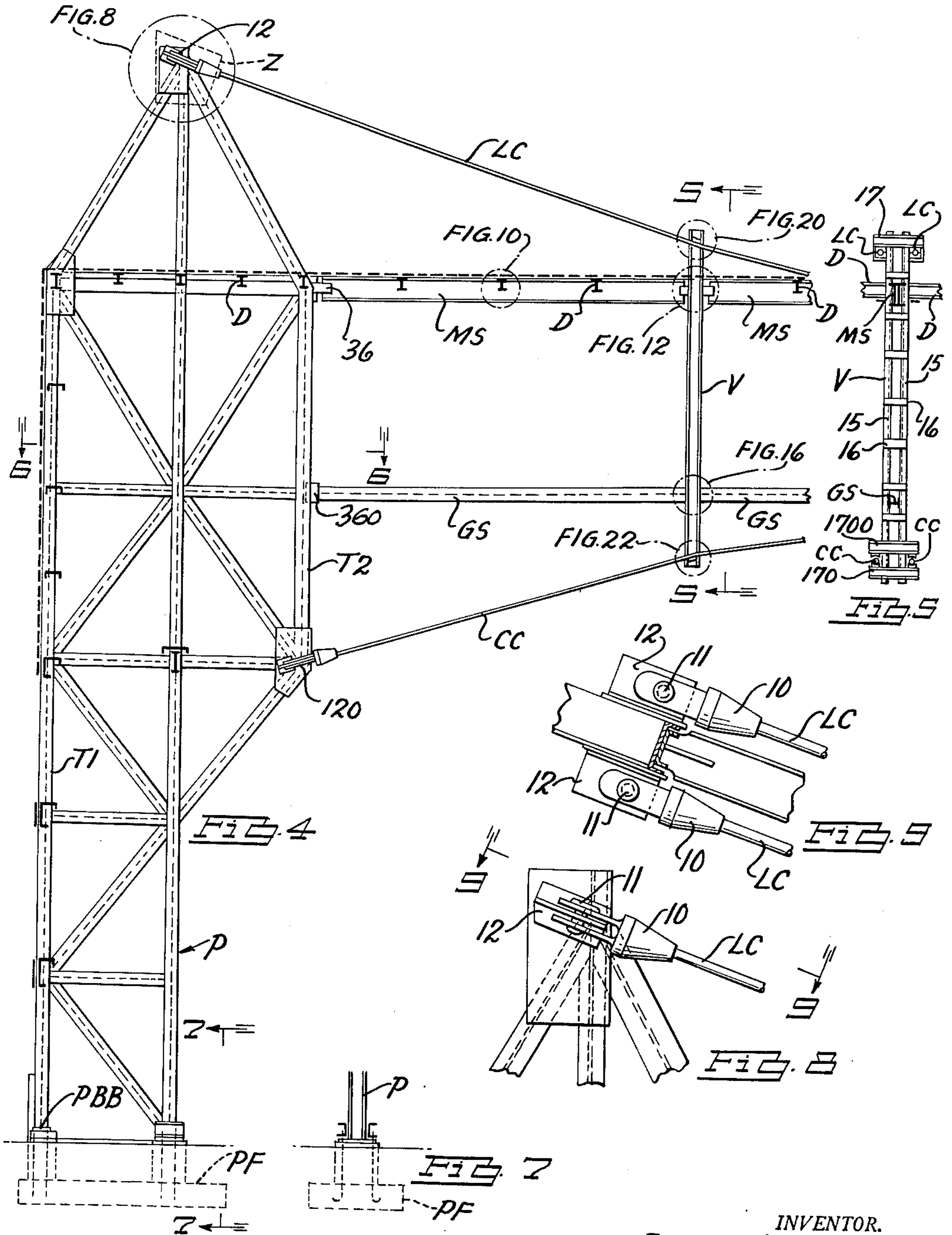
Fig. 4 is an enlarged fragmentary vertical elevational view similar to Fig. 2.
Fig. 5 is a vertical sectional view taken on the line 5—5 of Fig. 4.
Fig. 7 is a fragmentary elevational view taken on the line 7—7 of Fig. 4.
Fig. 8 is an enlarged detailed view of the load cable anchorage taken at the dot and dash circle in Fig. 4 designated "Fig. 8."
Fig. 9 is a top plan view of the construction shown in Fig. 8 taken on the line 9—9 of Fig. 8.
Figure 6:
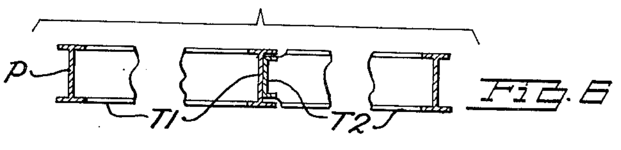
Fig. 6 is an enlarged horizontal sectional view taken on the line 6—6 of Fig. 4.
Figure 34:
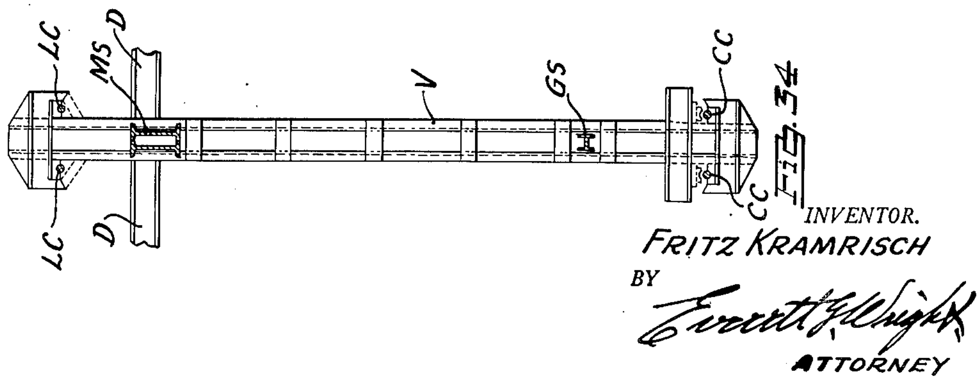

Fig. 34 is an enlarged sectional view taken on the line 5—5 of Fig. 4 showing the use of double load carrying cables and double counter-cables in structures embodying the invention.

Figure 35:
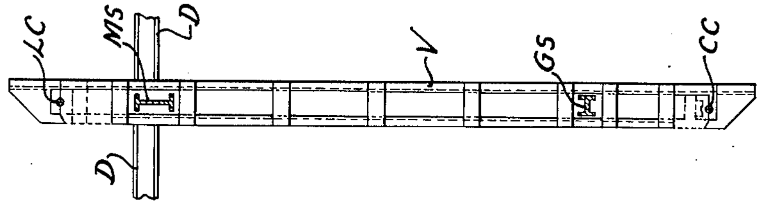

Fig. 35 is a view similar to Fig. 34 except showing the use of one load carrying cable and one counter-cable.

Figure 36:
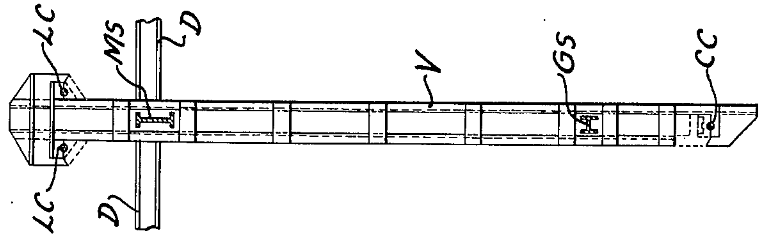

Fig. 36 is a view similar to Fig. 34 except showing the use of two load carrying cables and one counter-cable.

Figure 37:
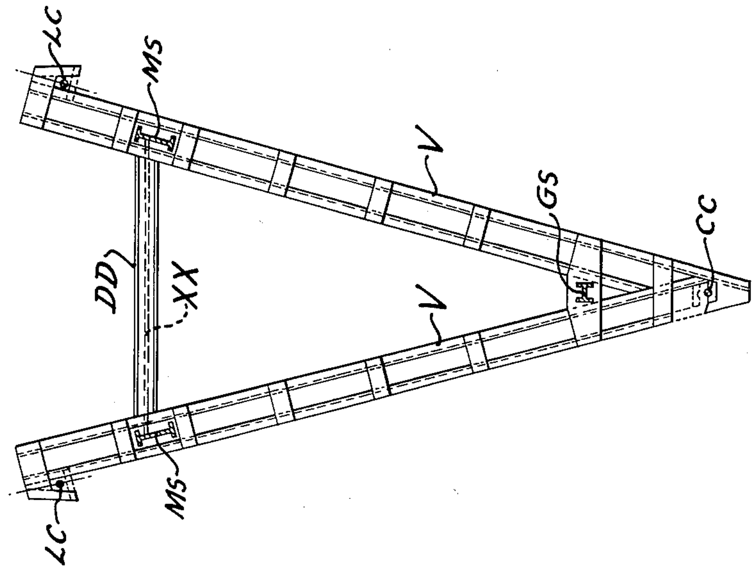

Fig. 37 is a view similar to Figs. 34 and 36 except showing the use of two widely spread load carrying cables and one counter-cable and indicating use of the invention in relatively narrow structures.

Figure 38:
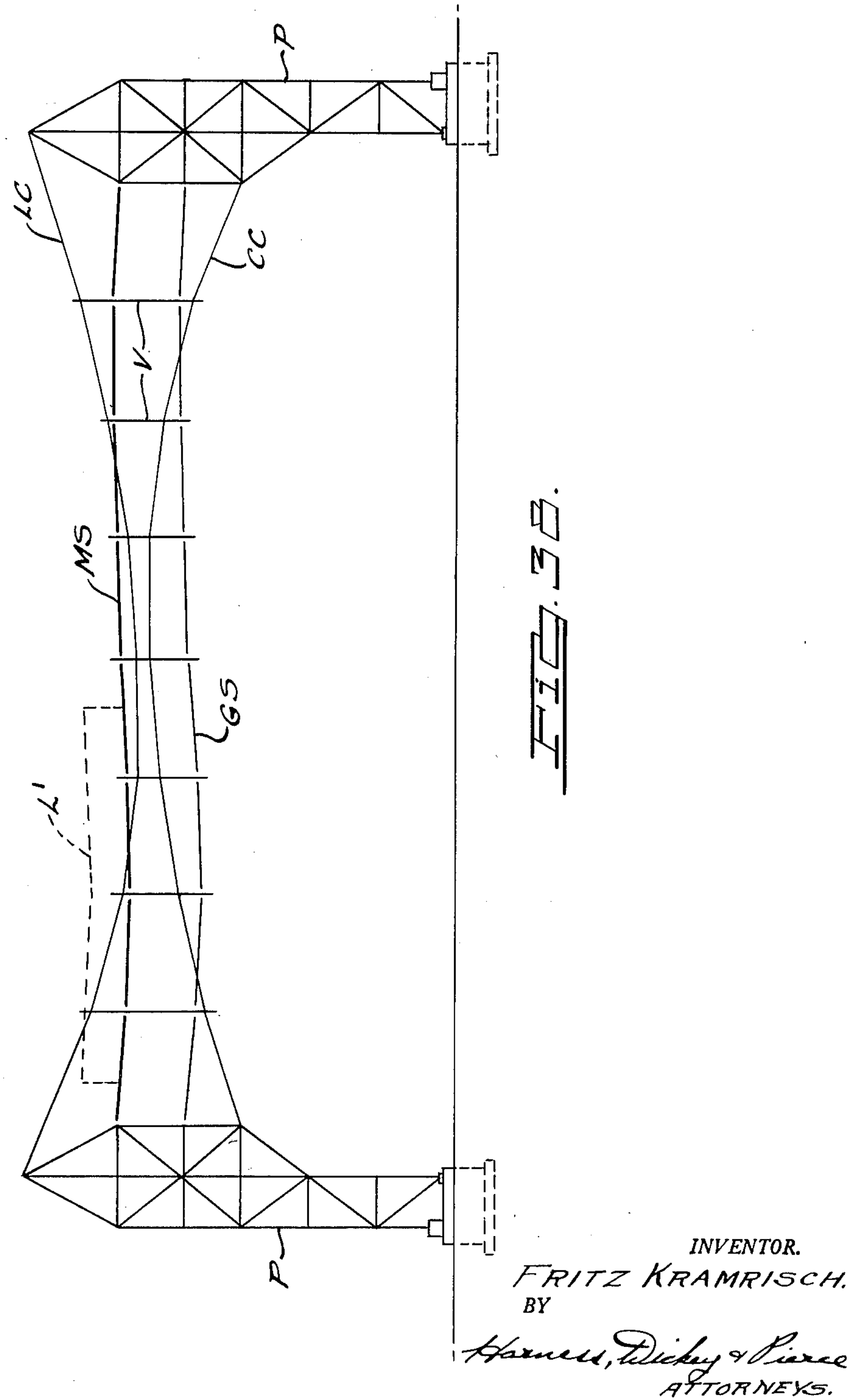

Fig. 38 is a diagrammatic view showing the effect of an unsymmetrical loading of the structure.

Referring now to the drawings where like reference characters refer to like and corresponding parts throughout the several views, the embodiment of the invention shown for the purpose of illustration and without any intent of limitation of the scope of the invention is a 300 ft. span roof structure having a clear height of 60 ft. at its center and 30 ft. bent spacing; the dimensions being given only for the purpose of indicating the general proportions of the structure disclosed.

Figure 2:
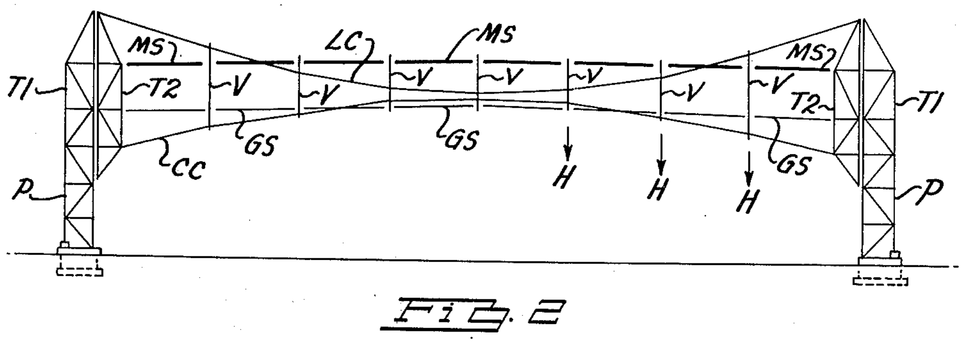
Fig. 2 is a vertical elevational view showing diagrammatically a typical bent taken on the line 2—2 of Fig. 1.

The illustrative structure comprises a series of parallel bents B each composed of a pair of spaced pylons P, a load carrying cable LC suspended between the said pylons P, a plurality of load carrying verticals V suspended from but not fixed to the said load carrying cable LC spaced therealong, a series of load carrying main struts MS extending between the said pylons P and each of the said verticals V hingedly connected to each of the said pylons P and to the said verticals V, a series of guide struts GS disposed in parallel spaced relationship below the said load carrying main struts MS extending between the said pylons P hingedly connected to the said pylons P and to each of the said verticals V, a counter-cable CC suspended from but not fixed to the said verticals V, extending between the said pylons P and anchored in tensional relationship thereto, an upper bracing system E and a lower bracing system F disposed between the said upper and lower struts MS and GS respectively of adjacent bents B, and purlins D framed between the adjacent load carrying main struts MS supporting a roof and roofing not shown. The said roof and roofing may be of any desired material such as metal or wood decking covered with a suitable roofing such as paper or felt. Any hanging loads diagrammatically indicated by the reference H in Fig. 2 may be suspended from the structure at the verticals V of any of the bents B.

*Pylons.*—The pylons, columns or supports P may be of any shape and design to withstand the stresses applied thereto by the load carrying cables LC, the counter-cables CC, the struts MS and GS, and wind stresses. The pylons P are stressed by the pull of the load carrying cables LC and the counter-cables CC opposed by the load carrying main struts MS and the guide struts GS. In the particular illustration of the invention shown in the drawing, to permit the maximum shop fabrication and reduce the amount of field work, double pylon trusses T-1 and T-2 are used at the upper portion of the pylon P to handle the pylon stresses economically. The trusses T-1 and T-2 are shop built, shipped separately, and only need be field connected together to complete a pylon P. The base of the exterior column of each pylon P is so constructed at PBB as to permit it to be freed from anchorage during erection and then shimmed and anchored after erection and after the counter-cables CC are tensioned.

*Load carrying cables.*—The load carrying cables LC carry the entire designed load of each bent B. In the particular illustrative embodiment of the invention disclosed in Figs. 1 to 34 inclusive, two load carrying cables LC are employed. The load carrying cables LC are each provided with an anchorage socket 10 which is pin connected by a suitable pin 11 to brackets 12 provided at the top of each pylon P. The load carrying cables LC are preferably multiple-strand steel wire cables. The said load carrying cables LC may be pre-stressed at the factory if desired, such pre-stressing being generally employed as common practice for the purpose of increasing the modulus of elasticity of the cables to reduce deflection. To correct inaccurate cable lengths or pylon spacing, suitable cable length adjustment means may be incorporated at the cable anchorages. Obviously, cable lengths may require adjustment due to uneven or excess cable stretching under load.

*Verticals.*—The verticals V carry all loads supported by the structure, which loads are transferred to the load carrying cables LC through the said verticals V by means of shoes SL carried by each of the said verticals V. As heretofore mentioned, the said verticals V are suspended from but are not fixed to the said load carrying cables LC, and are spaced along the said load carrying cables LC by means of a series of load carrying main struts MS which extend between the pylons P forming in effect a hinged through strut between the said pylons P. By referring particularly to Figs. 5, 20 and 21, it will be observed that the verticals V in the particular embodiment of the invention disclosed comprise a pair of channels 15 disposed back to back in parallel spaced relationship and held in such relationship by a series of batten plates 16. Across the top of and extending outwardly from each vertical V is a pair of header channels 17 on the underside of which is secured a pair of shoes SL each suitably concaved transversely to accommodate a load carrying cable LC and suitably curved longitudinally according to the flexibility of the cable to ease its change of inclination at each loading point. Each of the said shoes SL are preferably constructed alike and are fixed to the verticals V at the mean inclination of the load carrying cables LC at each location of the verticals V. Shims 18 are employed between the shoes SL and the header channels 17 of the verticals V to regulate or adjust the verticals to their proper height or elevation. Lock bars L are secured to each vertical V after erection to prevent shoes SL from slipping off or jumping off the load carrying cables LC in the event of sway after erection. Protective sheaths LCS may be provided on the load carrying cables LC to prevent wear of the load carrying cables LC at the shoes SL.

The verticals V are engaged by and tensioned downwardly by the counter-cables CC for the purpose of maintaining a deflection in the load carrying cables LC beyond the deflection normally occurring in the load carrying cables LC for any load smaller than the maximum load, the said counter-cables CC being designed to be sufficiently stressed to remain taut under maximum dead and live loading of the structure. The bottom of the said verticals V are tensioned downwardly by but are not fixed to the said counter-cables CC, and are spaced along the said counter-cables CC by means of a series of guide struts GS which extend between the pylons P forming in effect a hinged through strut between the said pylons P. By referring to Figs. 5, 22 and 23, it will be observed that the verticals V have secured across the bottom thereof and extending laterally therefrom a pair of base channels 170 and thereabove in spaced relationship to the said base channels 170 a pair of keeper channels 1700. On top of the base channels 170 is secured a pair of shoes SC each suitably concaved transversely to accommodate a counter-cable CC and suitably curved longitudinally according to the flexibility of the cable to ease its change of inclination at the loading point when tensioned between the pylons P in a curvature generally opposite to the load carrying cables LC. All of the shoes SC are preferably constructed alike and are fixed to the verticals V at the mean inclination of the counter-cables CC at each location of the verticals V. Countershoes SCC of the same general design as the shoes SC but secured to the keeper channels 1700 and turned downwardly prevent the counter-cables CC from jumping off the shoes SC. The said countershoes SCC also serve as seats for the verticals V when the said verticals V are urged downwardly against the top of the counter-cables CC due to unsymmetrical loading conditions on the cable supported long span structure embodying the invention. Shims 180 and 1800 are employed between the shoes SC and SCC and the base channels 170 and the keeper channels 1700 respectively to permit adjustment.

Figure 1:
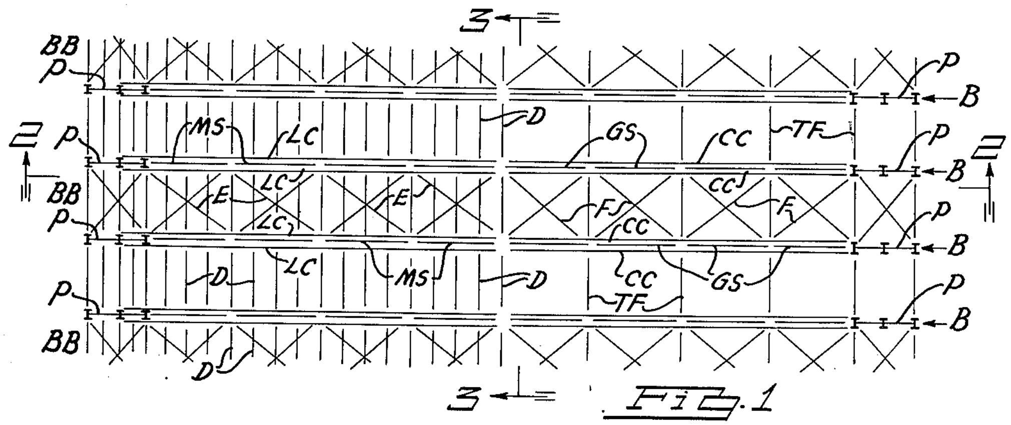
Fig. 1 is a structural framing plan of several bents of a cable-supported long span structure embodying the invention, the left half of the framing plan being taken at the main strut level and the right half being taken at the guide strut level.
Figure 10:
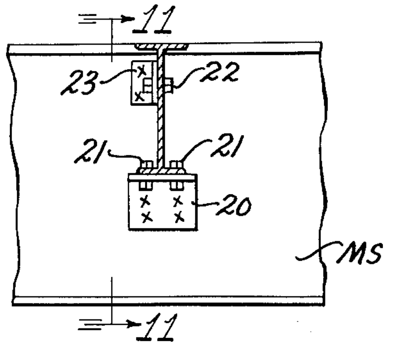
Fig. 10 is an enlarged detailed view of a purlin connection to a main strut taken at the dot and dash circle in Fig. 4 designated "Fig. 10."
Figure 11:
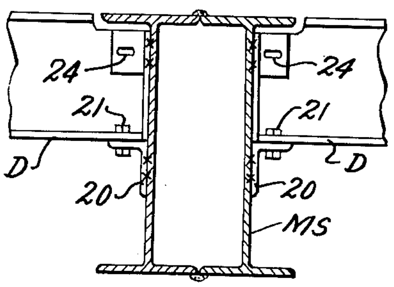
Fig. 11 is a vertical sectional view taken on the line 11—11 of Fig. 10.
Figure 12:
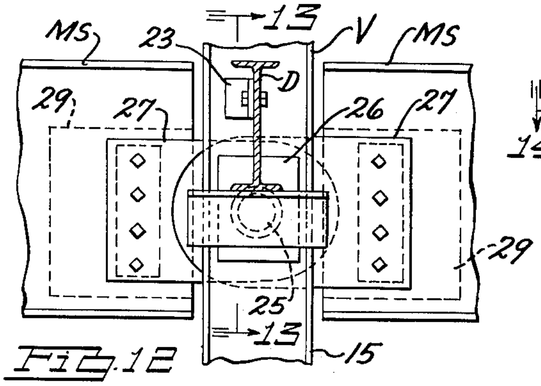
Fig. 12 is an enlarged detailed view of an intersection of a main strut with a vertical taken at the dot and dash circle in Fig. 4 designated "Fig. 12."
Figure 13:
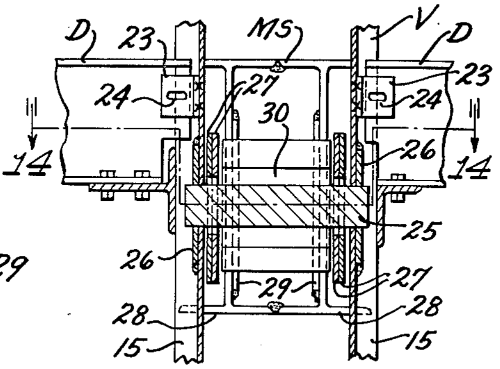
Fig. 13 is a vertical sectional view taken on the line 13—13 of Fig. 12.
Figure 14:
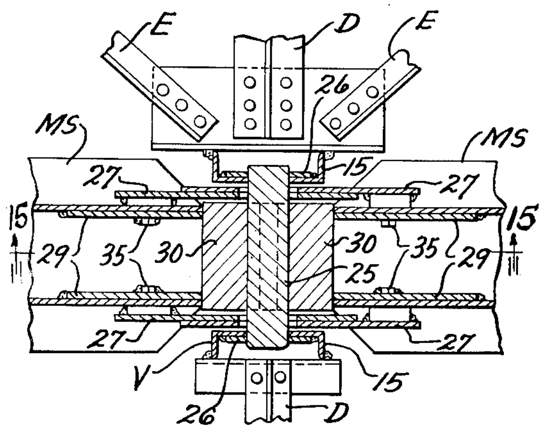
Fig. 14 is a horizontal sectional view taken on the line 14—14 of Fig. 13.
Figure 15:
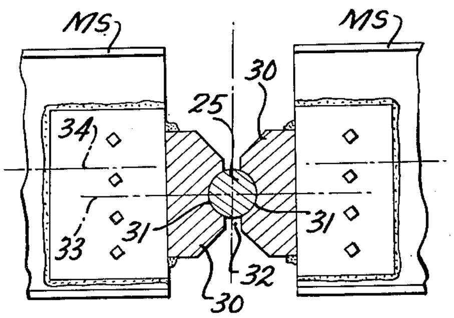
Fig. 15 is a vertical sectional view taken on the line 15—15 of Fig. 14.
Figures 29, 30, 31, 32, 33:
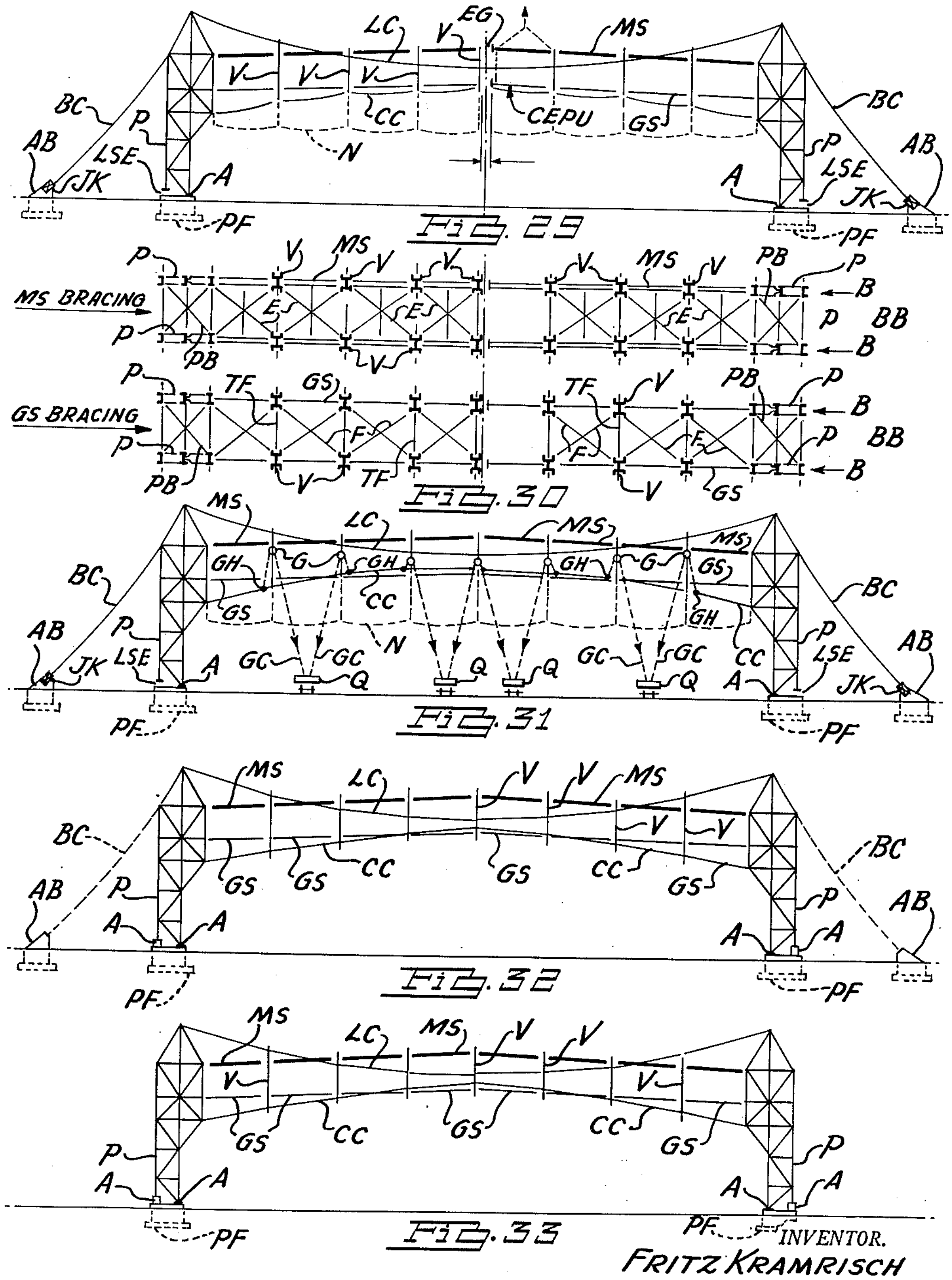

*Main struts, purlins and bracing of main struts.*—The tension or pull exerted by the load carrying cables LC on opposite pylons P of each bent B is counteracted by compression in the main load carrying struts MS, a series of which extend from pylon P to pylon P of each bent B. This eliminates the necessity for back stay cables BC except during erection as hereinafter describe in detail. The main struts MS are termed "load carrying" because they serve as roof girders to which are framed the purlins D as shown in Figs. 10 and 11. It will be noted that the purlins D, which in the particular embodiment of the invention disclosed are I-beams, are supported on an angle seat 20 and are bolted thereto by means of bolts 21. The webs of the purlins D are bolted by bolts 22 to clips 23 welded to the main strut MS as indicated in Fig. 10. By referring to Fig. 11, it will be observed that slotted holes 24 are employed for the bolts 22 which permits the purlins D to rotate slightly on a horizontal axis around the seats 20. This construction prevents secondary stresses from building up at the connections between the purlins D and the main struts MS. The purlins D serve as transverse bracing at all bays laterally between the main struts MS. Suitable diagonal bracing E is provided at braced bays BB between adajacent lines of main struts MS, the said diagonal bracing E extending between the main struts MS at the verticals V as indicated in Figs. 1, 14 and 30.

*Connection of main struts and verticals.*—It is important to note that the connection of the main struts MS to the verticals V and to each other is a pin connected joint which permits movement of either of the main struts MS or the vertical V about a single transverse pin at any joint between the main struts MS independent of the outer members at the said joint. By referring to Fig. 12–15 inclusive, the connection of main struts MS at verticals V as used in the illustrative embodiment of the invention disclosed herein is shown in detail. A pin 25 is disposed through and welded to the backs or webs of the two vertical channels 15 of the vertical V, and the said vertical channels 15 are reinforced at the pin 25 by means of reinforcing plates 26 welded thereto. Around the pin 25 are journaled two pairs of tie plates 27 prior to welding of the pin 25 to the channels 15 of the verticals V, which tie plates 27 are secured to the main struts MS as hereinafter described. In the particular embodiment of the invention disclosed, the main struts MS comprise a pair of I-beams 28 welded together laterally at their flange edges. The webs of the said I-beam 28 comprising the main struts MS are reinforced at their ends by suitable reinforcing plates 29 welded thereon. A bearing block 30 is welded onto the said reinforced web ends of each main strut MS. Each bearing block 30 of the main struts MS is transversely grooved at 31 to fit laterally over the pin 25 of a vertical V leaving a space 32 between the bearing block 30 on the opposite ends of the main struts MS meeting at a vertical V. The horizontal center 33 of the bearing blocks 30 at any joint between a vertical V and two main struts MS is preferably located a distance below the horizontal center 34 of the main struts MS to balance approximately one-half of the bending moment from intermediate vertical loads delivered by the purlins D to the main struts MS. The pins 25 and bearing blocks 30 must be designed to transmit from the main struts MS to the verticals V, in addition to the compressive forces carried by the main struts MS, all of the shear due to roof loads and wind stresses, and, the two main struts MS and the vertical V at any joint must rotate with respect to each other about the pin 25. Upon assembly of the struts MS to the vertical V, the bearing blocks 30 are positioned laterally over the pin 25 and the tie plates 27 are bolted or otherwise secured to the main struts MS at 35. The main struts MS adjacent to the pylons P are pin connected at 36 to the said pylons P by means of a suitable transversely disposed pin.

*Counter-cables.*—Counter-cables CC are provided below the load carrying cables LC for the purpose of stiffening the structure. The counter-cables CC are of smaller cross section, take less stress, are disposed below and in spaced relationship to the load carrying cables LC, and are of a generally opposite curvature. The stress in the counter-cables CC decreases with increasing loading of the load carrying cables LC and vice versa, however, the counter-cables CC are designed to be somewhat stressed and always taut, even under full load conditions. In the particular illustrative embodiment of the invention disclosed in Figs. 1–34 inclusive, the counter-cables CC are similiar to but lighter than the load carrying cables LC and are connected to the pylons P directly below the load carrying cables LC with suitable seats and brackets 120. To correct inaccurate cable lengths or pylon spacing, suitable cable length adjustment means may be incorporated at the cable anchorages. Obviously, cable lengths may require adjustment due to uneven or excess cable stretching under load.

Figures 16, 17, 18, 19, 20, 21, 22, 23:
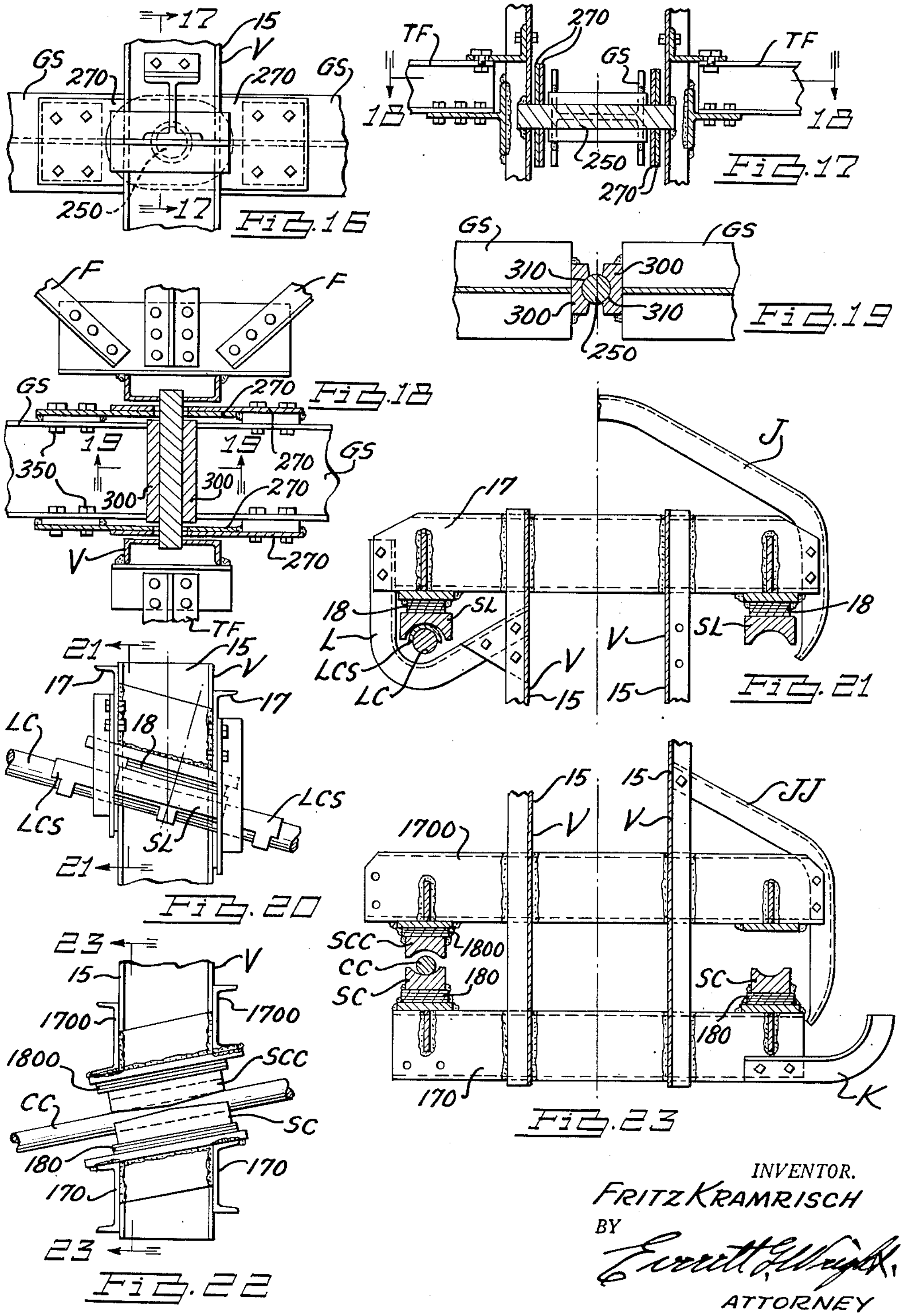
Fig. 16 is an enlarged detailed view of an intersection of a guide strut with a vertical taken at the dot and dash circle in Fig. 4 designated "Fig. 16."
Fig. 17 is a vertical sectional view taken on the line 17—17 of Fig. 16.
Fig. 18 is a horizontal sectional view taken on the line 18—18 of Fig. 17.
Fig. 19 is a vertical sectional view taken on the line 19—19 of Fig. 18.
Fig. 20 is an enlarged detailed view of a load cable seat taken at the dot and dash circle in Fig. 4 designated "Fig. 20."
Fig. 21 is a vertical sectional view taken on the line 21—21 of Fig. 20 showing at its right side a load cable seat during erection, and at its left side a load cable seat positioned on a load cable after erection.
Fig. 22 is an enlarged detailed view of a counter-cable seat taken at the dot and dash circle in Fig. 4 designated "Fig. 22."
Fig. 23 is a vertical sectional view taken on the line 23—23 of Fig. 22 showing at its right side a counter-cable seat during erection, and at its left side a counter-cable seat positioned under a counter-cable after erection.

*Guide struts and bracing of guide struts.*—The tension or pull exerted by the counter-cables CC on opposite pylons P of each bent B is counteracted by compression in the guide struts GS, a series of which extend from pylon P to pylon P of each bent B. The guide struts GS are provided below the main struts MS for the purpose of maintaining the verticals V always in a vertical or parallel to pylon axis position. The guide struts GS further serve as a chord for wind bracing at braced bays BB. The guide struts GS are disposed parallel to the main struts MS, and, in the particular embodiment of the invention disclosed herein consist of a single beam having its web disposed in a horizontal position. Transverse bracing members TF are framed between the guide struts GS at each vertical V, the connections between the transverse bracing members TF and the guide struts GS preferably being accomplished in such a manner as to permit the bracing members TF to rotate slightly on a horizontal axis with respect to the verticals V. The connections between the transverse bracing members TF and the verticals V may be accomplished in a manner like or similar to the connections between the purlins D and the main struts MS. The connections should be such as to prevent secondary stresses from building up at the connections between the transverse bracing members TF and the verticals V. Suitable diagonal bracing F is provided between adjacent lines of guide struts GS, the said diagonal bracing F extending between the guide struts GS at the verticals V as indicated in Figs. 1, 18 and 30.

*Connection of guide struts and verticals.*—The connection of the guide struts GS to the verticals V and to each other is like and similar to the connection of the main struts MS to the verticals V and to each other. The said connection of the guide struts GS to the verticals V and to each other is a pin connected joint which permits movement of either of the guide struts GS or the vertical V about a single transverse pin at any joint between guide struts GS independent of the other members at the said joint. By referring to Figs. 16–19 inclusive, the connection of the guide struts GS at the verticals V as used in the illustrative embodiment of the invention disclosed herein is shown in detail. A pin 250 is disposed through and welded to the backs or webs of the two vertical channels 15 of the vertical V. Around the pin 250 are journaled two pairs of the plates 270 prior to welding the pin 250 to the channels 15 of the vertical V, which tie plates 270 are secured to the guide struts GS as hereinafter described. In the particular embodiment of the invention disclosed, the guide struts GS comprise an I-beam disposed with its web horizontal. A bearing block 300 is welded onto the ends of each of the guide struts GS. Each of the said bearing blocks 300 is transversely grooved at 310 to fit laterally over the pin 250 of the vertical V. The pins 250 and the bearing blocks 300 must be designed to transmit from the guide struts GS to the verticals V, in addition to the compressive forces carried by the guide struts GS, all of the shear due to any hanging loads on the guide struts GS and wind stresses, and, the two guide struts GS and the vertical V at any joint must rotate with respect to each other about the pin 250. Upon assembly of the guide struts GS to the vertical V, the bearing blocks 300 are positioned laterally over the pin 250 and the tie plates 270 are bolted or otherwise secured to the guide struts GS at 350. The guide struts GS adjacent to the pylons P are pin connected at 360 to the said pylon P by means of a suitable transversely disposed pin.

*Erection.*—Referring now particularly to Figs. 24–33 inclusive, a preferred method of erecting structures embodying the invention will be described. Pylon footings PF and anchor blocks AB properly located to accommodate the pylons P of each bent B are preferably constructed of reinforced concrete and include suitable anchor bolts to anchor pylons P and hydraulic jack JK respectively thereto, the detailed construction of the pylon footings PF and anchor blocks AB being of the usual standard footing and anchor block construction of sufficient size and design to accommodate the loads and stresses to be applied thereto.

Figure 3:
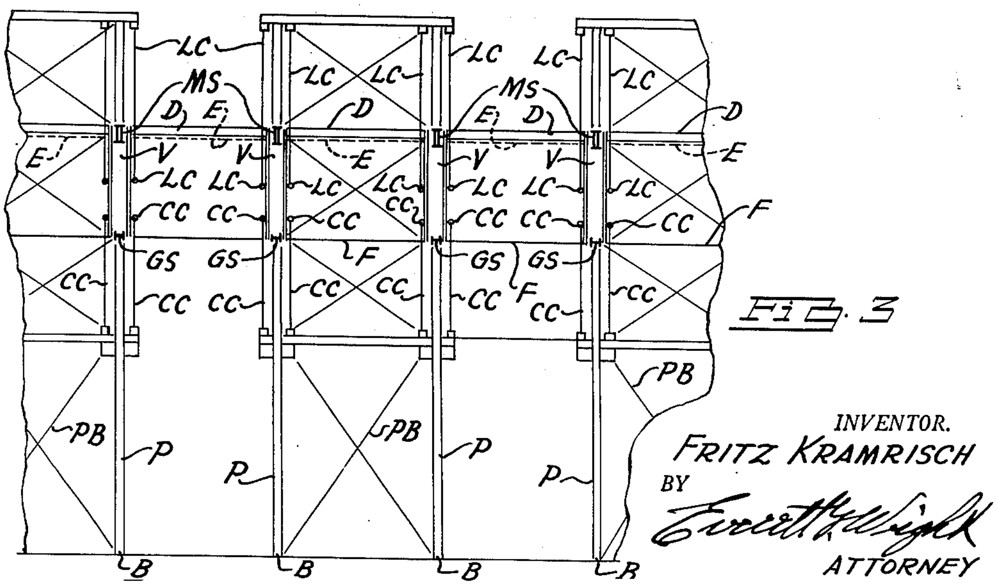
Fig. 3 is an enlarged vertical sectional view taken on the line 3—3 of Fig. 1.
Figure 24:
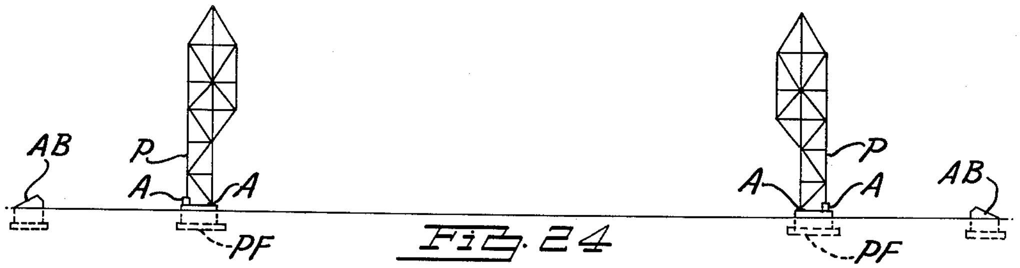
Figure 25:
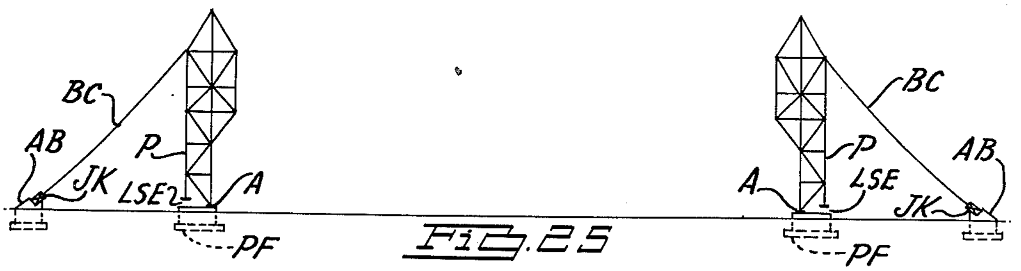

After the pylon footing PF and the anchor blocks AB have been constructed, two adjacent pylons P on each side of the structure are erected as indicated in Fig. 24, the said adjacent pylons P being braced together by pylon bracing PB as indicated in Figs. 3 and 30. In this stage of erection, each pylon P is anchored to its base at both the inside and outside legs thereof as indicated by the reference character A.

To counteract the inside pull of the load cables LC under erection loading, a backstay cable BC is secured to the top of each pylon P and is anchored to its anchor block AB through a hydraulic jack JK. The hydraulic jacks JK are employed for the purpose of adjusting the backstay cables BC to keep the pylons P in the proper position during erection. Just before the load cables LC are suspended between pylons P, the anchors A at the outside leg of each pylon P are loosened as indicated by the reference LSE, see Fig. 25.

Figure 26:
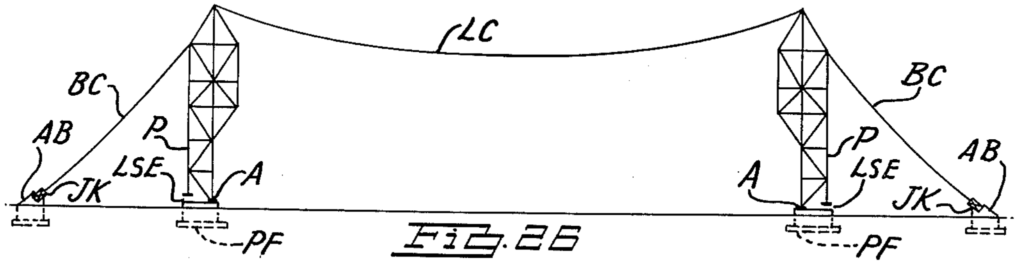

The load carrying cables LC are hoisted to position and secured to the top of the pylons P as indicated in Fig. 26. Immediately after the erection of the load carrying cables LC, weather hoods Z indicated in dotted lines in Fig. 4 may be placed over the load carrying cable anchorages at the top of the pylon P.

Figure 27:
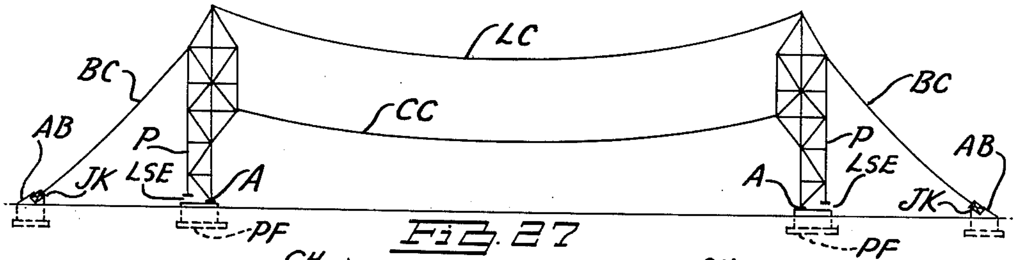

The counter-cables CC are hoisted to position and secured to the pylons P at the connection provided by the brackets 120 on the pylons P. At this stage of erection, the counter-cables CC are in a suspended position as shown in Fig. 27.

The counter-cables CC may be lifted now at the center of the span to their approximate final elevation and may be supported from the load cables LC thereabove whereby to facilitate the lifting of the counter-cables CC during further erection.

Figure 28:
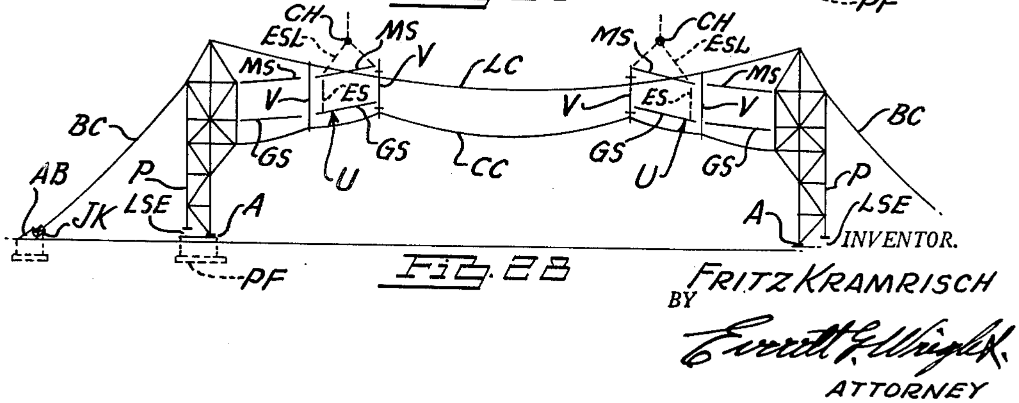

While the pylons P and the load carrying cables LC and counter-cables CC are being erected, erection panels U consisting of one vertical V, one main strut MS, one guide strut GS and one erection strut ES are assembled. The erection of the said erection panels U starts simultaneously from each end of the span at the pylons P progressing evenly to the center of the span, the erection struts ES being removed as the connection of each erection panel U to the already erected adjacent structure is made. To accomplish and facilitate erection of the erection panels U, each vertical V is provided with a suitable bent pair of spreader angles J disposed across the top thereof and erection bolted to the header channels 17 of the vertical V, and each vertical V is provided on each side thereof with a suitable bent pair of spreader angles JJ erection bolted to the vertical channels 15 and keeper channels 1700 thereof, and each vertical V is further provided with a pair of cable hook bars K erection bolted in lateral extending relationship from the base channels 170 of the said vertical V, see the right hand half of Figs. 21 and 23. A crane hook CH is lowered between the load carrying cables LC and counter-cables CC of adjacent bents B and an erection sling ESL is fastened to the top of the erection panel U as indicated in Fig. 28. As an erection panel U is hoisted, the spreader angles J and JJ spread the counter-cables CC and the load carrying cables LC and permit the erection panel U to be lifted until the load carrying cables LC slide off the spreader angles J onto the shoes SL provided on the header channels 17 of the vertical V therefor. Lock bars L are now secured to the header channels 17 and the vertical channels 15 of the vertical V to maintain the shoes SL of the vertical V in seated relationship onto the load carrying cables LC, see the left hand half of Fig. 21. As the said erection panel U is hoisted, the cable hook bars K indicated in the right hand half of Fig. 23 engage the counter-cables CC and lift them to a relatively loose reverse catenary position. The spreader angles J and JJ are then removed from the vertical V of the erection panel U. After all of the erection panels U have been hoisted in place, the last erection panel U designated the closing erection panel CEPU is held in suspension until the erection gap EG is closed by rocking the pylons P by means of manipulating the hydraulic jacks JK. The erection just described is indicated diagrammatically in Figs. 28 and 29. At this point, the counter-cables CC are still supported on the cable hook bars K, and are not taut. Inasmuch as the connections between the main struts MS, the verticals V and the guide struts GS are accomplished at a considerable distance above the ground, an erection net as indicated by the dotted lines N in Fig. 29 may be employed.

The erection of purlins D and main strut bracing E, and the erection of transverse bracing members TF and guide strut bracing F is next accomplished. Because of the fact that all of the connections between the purlins D and the main struts MS and the connections between the transverse bracing members TF and the verticals V allow sufficient flexibility, their erection at this time will not interfere with the later stressing of the load carrying cables LC by the counter-cables CC and any possible adjustment in the pylons P. Fig. 30 shows diagrammatically the bracing E and F at the levels of the main struts MS and the guide struts GS respectively. It will be noted that the bracing E and F may progress during the erection of the erection panels U, however, if this is done, it is important that the bracing E and F be omitted at the closing erection panel CEPU until the erection gap EG is closed.

Referring now to Fig. 31, tackles G are now employed to stress and to pull the load carrying cables LC and the counter-cables CC into their final position. Preferably two sets of tackle G are employed at each vertical V. The lifting hooks GH of the tackles G are clipped to the counter-cables CC at a slight distance outwardly from the shoes SC. Suitable winches Q mounted on ballasted trucks or other pulling means may be employed to pull the lifting cables GC which extend through apertures provided in the safety net N. Inasmuch as the tackles G are connected to the verticals V and the lifting hooks GH are clipped onto the counter-cables CC, the verticals V and the load carrying cables LC are pulled down simultaneously with the pulling up of the counter-cables CC from the cable hooks K, and thus, the counter-cables are pulled up and onto the shoes SC simultaneously with pre-stressing the load carrying cables LC. The struts MS and GS are now under compressive stress, although not fully stressed because the backstay cables BC are still under stress and relieve some of the compressive stress on the struts MS and GS. Counter shoes SCC are now fixed to the bottom of the keeper channels 1700, the tackles G are removed, and the safety nets N also may be removed.

The structure is now erected to the stage indicated in Fig. 32 whereupon the outside legs of the pylons P are fixed and shimmed into their final position, and the anchors A are tightened. The backstay cables BC are then loosened and removed, and the completed structure is free-standing as indicated in Fig. 33.

Obviously, other methods of erection of cable supported long span structures embodying the invention and other methods of bringing the cables under stress may be employed, and the procedural steps altered to accommodate the disclosure erection method to the many and varied problems arising from the design and construction of structures embodying the invention to suit the particular requirements of each specific structure.

Referring now to Figs. 34–37 inclusive, typical sections through four adaptations of the present invention are indicated. Fig. 34 is an enlarged sectional view similar to Fig. 5 showing the cable supported long span construction just described in detail wherein a pair of load carrying cables LC and a pair of counter-cables CC are employed, the cables of each of the said pairs of cables being closely adjacent. Fig. 35 discloses construction like and similar to that shown in Fig. 34 except that a single load carrying cable LC and a single counter-cable CC are and similar to that shown in Figs. 34 and 35 except that a pair of closely adjacent load carrying cables LC and a single counter-cable CC are employed. Fig. 37 discloses construction like and similar to that shown in Figs. 34, 35 and 36 except that a pair of widely separated load carrying cables LC, a single counter-cable CC and two verticals V are employed, the verticals V being connected together at their bottoms, and separated at their tops by struts DD and cross bracing XX disposed in the plane of the said struts DD. The embodiment of the invention disclosed in Fig. 36 is applicable to structures which are very narrow and need be self-braced laterally whereby to eliminate the necessity of relying on the lateral bracing from adjacent bays for lateral stability. Where a single cable or a pair of cables is indicated, obviously multiple cables may be substituted for single cables and multiple pairs of cables may be substituted for pairs of cables.

It will be noted that at each bent B, the verticals V are not fixed to the load carrying cables LC and the counter-cables CC. The said load carrying cables LC and the counter-cables CC are free to move longitudinally with respect to the verticals V. Further, the verticals V and the main struts MS and the guide struts GS form a series of parallelograms hinged at their corners capable of deviating from their normal attitude responsive to unsymmetrical loading conditions applied to the structure. When these parallelograms become distorted from their normal attitude responsive to unsymmetrical loading of the structure, the load carrying cables LC and the counter-cables CC follow their proper assumed attitude and deformations under varied loading conditions without dislocating the verticals of the parallelograms.

The main struts MS extending between the pylons P counteract the pull of the load carrying cables LC. The guide struts GS extending between the pylons P counteract the pull of the counter-cables CC. The stiff verticals V transmit loads to the load carrying cables LC and transmit loads and counter-loads between the load carrying cables LC and the counter-cables CC and maintain the distance between them constant.

In the above described structure when a uniform load is distributed along the main struts, as for example, the dead load of a roof construction, the load carrying cables LC are in tension, the verticals V are subjected to tension and bending stresses, the main strut segments MS are subjected to bending, being beams supported at their ends, the main strut segments MS and the guide strut segments GS are loaded in compression, and the counter-cables CC are under tension because of the above described prestressing thereof. When the loading of the structure is increased uniformly all of the above described stresses are increased with the exception of the tension in the counter-cables CC which is reduced. If instead, the structure is subjected to a substantial nonsymmetrical load such as that indicated at L′ in Figure 38, the tension in the load carrying cables LC is increased, the tension in the counter-cables is reduced, the compression in the main strut segments MS and guide strut segments GS is increased, and the tension in the verticals V is increased. Referring to Figure 38, it will be noticed that the change in angle of the load carrying cables LC at the verticals V is greater in the left-hand half of the structure as there viewed and similarly, that the change in angle of the counter-cable at the verticals V is greater in the right-hand half of the structure. The bending load imposed on the verticals is a function of this change in angle and the unsymmetrical load L′ produces a relatively greater increase in the bending loads imposed by the cables LC and CC on the verticals V at the above mentioned places where Figure 38 illustrates relatively larger angle changes of these cables at the verticals.

The use of hinged connections between the verticals V and the main struts MS and the guide struts GS coupled with the longitudinally movable connection of the load carrying cables LC and the counter-cables CC to the verticals V permits the entire structure to follow deformations caused by unsymmetrical loading conditions without producing secondary stresses in the various component members of the structure, all of which leads to economy in design.

The counter-cables CC which are disposed in curvature generally opposite to the load carrying cables LC stress the said load carrying cables LC under all conditions of loading the structure. The counter-cables CC maintain the main struts MS against upward movement and reduce the deflection of the structure under both symmetrical and unsymmetrical loading conditions.

The novel construction disclosed produces a unitary structure of limited flexibility which moves into a condition of equilibrium by adjusting itself to any condition of symmetrical or unsymmetrical loading, all without producing uncontrolled or high secondary stresses in any of its several members.

Although but one specific embodiment of the invention has been disclosed and described in detail and several modifications have been shown and described, it is obvious that many changes may be made in the size, shape, arrangement and detail of the various elements of the invention without departing from the spirit and scope thereof as defined by the appended claims.

I claim:

1. A structure of the class described, comprising a pair of spaced supporting members, downwardly curved load carrying cable means supported by and extending between said supporting members, a plurality of rigid vertical members spaced along said load carrying cable means, each said vertical member being suspended from and including means engaging said cable means and movable longitudinally of said cable means, a pair of vertically spaced and laterally braced struts substantially horizontally disposed and extending between said supporting members, each of said struts comprising a plurality of strut segments arranged in generally end-to-end relation, the outer ends of the end segments of each of said vertically spaced struts pivotally engaging the adjacent one of said supporting members and the remaining ends of said strut segments pivotally engaging said vertical members, each of said end segments of the upper of said vertically spaced struts co-operating with the adjacent end segment of the lower of said vertically spaced struts and with the supporting member and the vertical member which they pivotally engage to define a parallelogram under all loading conditions for which said structure is designed, and each of the strut segments of said upper strut intermediate the end segments thereof co-operating with an intermediate strut segment of said lower strut and with the vertical members to which they are pivotally connected to define a parallelogram under all loading conditions for which said structure is designed, counter-cable means extending between and engaging said supporting members and having an upward curvature generally opposite to that of said load carrying cable means, and means on each of said vertical members engaged by and movable longitudinally of said counter-cable means, said counter-cable means being prestressed to a degree such that it is maintained under tension under all loading conditions for which said structure is designed.

2. In a load supporting structure comprising a plurality of bents and interconecting means laterally bracing said bents, a bent comprising a pair of spaced supporting members, a downwardly curved load carrying cable connected to and supported by said supporting members, a plurality of rigid vertical members suspended on and including means engaging said cable for free movement longitudinally of said cable, a pair of vertically spaced and substantially horizontally disposed struts extending between said supporting members and comprising a main load carrying strut and a guide strut, each of said struts comprising a plurality of strut segments arranged in generally end-to-end relation, each of said segments extending between and being pivotally connected to an adjacent pair of said members and co-operating with said pair of members and with a segment of the other of said vertically spaced struts to define a parallelogram and maintain said pair of members in parallel relation under all loading conditions for which said structure is designed, and a counter cable connected to said supporting members in vertically spaced relation to said connections of said load carrying cable thereto and having an upward curvature generally opposite to that of said load carrying cable, means on each of said vertical members engaged by and movable longitudinally of said counter cable, said counter cable being prestressed to a degree such that it is maintained under tension under all loading conditions for which said structure is designed.

3. A bent for a load supporting structure including a plurality of spaced bents and interconnecting means laterally bracing said bents, said bent comprising a pair of spaced supporting members, a downwardly curved load carrying cable connected to and supported by said supporting members, a plurality of rigid vertical members having means engaging and suspending said vertical members on said cable for free movement longitudinally of said cable, a pair of vertically spaced struts substantially horizontally disposed and extending between said supporting members, each of said struts comprising a plurality of strut segments arranged in generally end-to-end relation and each segment of each of said struts being of a length equal to the adjacent segment of the other of said struts from which it is vertically spaced, the end segments of each of said struts having their outer ends pivotally connected to said supporting members, and means pivotally connecting each pair of adjacent ends of said segments to one of said vertical members for pivotal movement about an axis individual to said pair, each pair of adjacent members co-operating with the strut segments extending therebetween and pivotally connected thereto to define a parallelogram under all loading conditions for which said structure is designed, a countercable connected to said supporting members in vertically spaced relation below said connections of said load carrying cable thereto and having an upward curvature generally opposite to that of said load carrying cable, means on each of said vertical members engaged by and movable longitudinally of said countercable, said countercable being prestressed to a degree such that it is maintained under tension under all loading conditions for which said structure is designed.

4. A structure as defined in claim 1 wherein said load carrying cable means consists of a pair of laterally spaced load carrying cables.

5. A structure as defined in claim 1 wherein said load carrying cable means consists of a pair of laterally spaced load carrying cables and said countercable means consists of a pair of laterally spaced countercables.

6. A structure is defined in claim 1 wherein said load carrying means consists of a pair of laterally spaced load carrying cables and said countercable means consists of a single countercable disposed intermediate said load carrying cables.

7. A structure as defined in claim 1 wherein said vertical members are generally V-shaped and said load carrying cable means consists of a pair of widely laterally spaced load carrying cables individual to and engaging the arms of said V-shaped vertical members.

FRITZ KRAMRISCH.

REFERENCES CITED

The following references are of record in the file of this patent:

UNITED STATES PATENTS

| Number | Name | Date |
|---|---|---|
| 470,992 | Day et al. | Mar. 15, 1892 |
| 472,862 | Day | Apr. 12, 1892 |
| 614,799 | Dodson et al. | Nov. 22, 1898 |
| 629,935 | Sturgis | Aug. 1, 1899 |
| 1,143,866 | Sturges | June 22, 1915 |

FOREIGN PATENTS

| Number | Country | Date |
|---|---|---|
| 428,341 | Great Britain | May 10, 1935 |

OTHER REFERENCES

Architectural Record, September 1936, pp. 236–237.